G. O. CLARK.
SPRING WHEEL.
APPLICATION FILED MAR. 10, 1911.
1,044,019.
Patented Nov. 12, 1912.
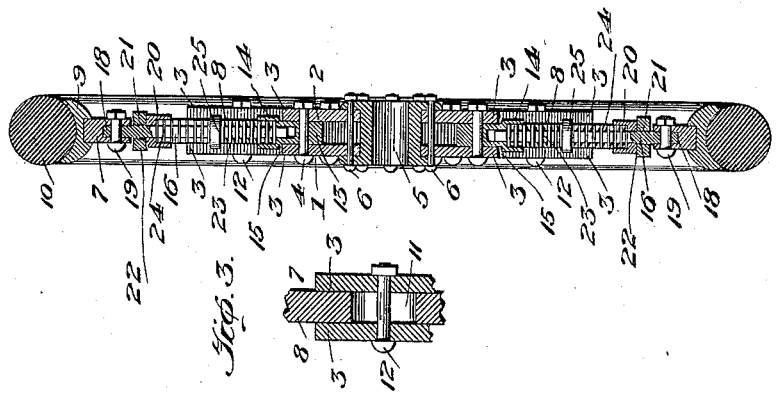
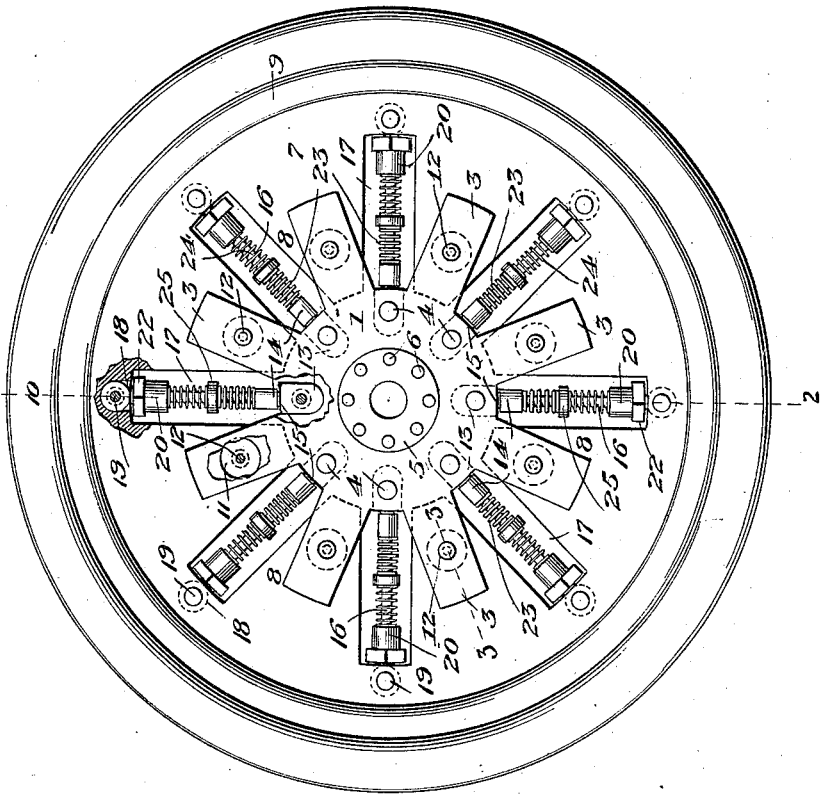
Witnesses
Inventor
George O. Clark
By
his Attorney

UNITED STATES PATENT OFFICE.

GEORGE O. CLARK, OF OLA, SOUTH DAKOTA.

SPRING-WHEEL.

1,044,019.   Specification of Letters Patent.   Patented Nov. 12, 1912.

Application filed March 10, 1911. Serial No. 613,598.

*To all whom it may concern:*

Be it known that I, GEORGE O. CLARK, a citizen of the United States, residing at Ola, county of Brule, and State of South Dakota, have invented certain new and useful Improvements in Spring-Wheels, of which the following is a specification.

This invention relates to spring wheels.

The present invention has for its object the provision of a spring wheel, provided with either a cushion, pneumatic or metal or other tire, of novel construction, few parts, strong and durable, in which buckling from lateral thrusts or strains will be obviated, and wherein the spring tension may be readily adjusted.

The invention is set forth fully hereinafter and the novel features are recited in the appended claim.

In the accompanying drawings: Figure 1 is a side elevation with certain parts broken away; Fig. 2, a section on line 2—2, Fig. 1; and Fig. 3, an enlarged section on line 3—3, Fig. 1.

The central part of the wheel is composed of plates 1 and 2, provided with radial arms 3 and connected by bolts 4, a suitable hub 5, secured to the plates 1 and 2 by bolts 6, being provided for the reception of the axle. Other forms of hub than that shown may be used without departing from my invention.

A disk 7 having inwardly, radially projecting members 8 lying between the members or arms 3, constitutes the movable part of the wheel which carries, in any suitable manner, a felly 9 and a tire 10, the form or type of the latter being immaterial, and this tire may be pneumatic, cushion, metal, or otherwise. The felly 9 may be connected to the part 7 in any preferred manner.

The members or arms 8 are provided with round holes 11 and the arms 3 are cross-connected by bolts 12 which pass through the holes (Fig. 3), whereby the outer part 7 of the wheel may move in relation to the inner part composed of the plates 1 and 2.

Pivoted on the bolts 4 are the flattened shanks 13 of the spring cups or sockets 14, the shoulders 15 on the cups overlapping but free of the periphery of the plates 1 and 2, whereby they are free to swing on bolts 4. Rods 16 disposed in the openings 17 between the arms or members 8, have one end loosely received in a cup 14 and the other end flattened at 18 and pivotally secured by a bolt 19 to the member 7. Loose on the rod 16 is a spring cup 20, and the rod is screw-threaded for a suitable distance at 21 and has a nut 22 by which the cup 20 may be adjusted inwardly. Coil springs surrounding each rod 16, have ends received in the cups 14 and 20, whereby the outer part 7 and the felly and tire are resiliently supported on the central part of the wheel. By preference, I provide a heavy coil spring 23 disposed nearest the central part of the wheel and a lighter coil spring 24 disposed beyond the same toward the tire, the respective springs being seated in the cups 14 and 20 and a head 25 being interposed between them and loose on the rod 16, in each instance.

By adjusting the nuts 22, the tension of the springs on the rod 16 may be regulated as desired. Ordinarily, the relatively light springs 24 yield and absorb the shock of the wheel striking any obstacle and also yieldingly support the weight which the wheel sustains, but when an unusually heavy weight is sustained or the impact is greater than usual on striking an obstacle, the relatively heavy springs 23 also yield, and thus while the tension of these springs 23 is normally such that they do not appreciably yield, the lighter springs 24 ordinarily serving that purpose, yet the said springs 23 constitute a reserve resiliency, as it were, so that all weights and shocks to which the wheel is subject are resiliently compensated.

At all times the parts 8 of the wheel are reinforced and guided by reason of their association with the spaced arms 1 and 2, and thus all lateral strains and stresses are compensated for and any tendency to buckle is obviated.

The holes 11 are made sufficiently large to permit all necessary relative up and down and forward and rearward movements of the outer and inner parts of the wheel.

Having thus described my invention, what I claim as new and desire to secure by Letters Patent, is:—

In a spring wheel, the combination with an inner member having radial arms arranged in spaced parallel pairs, of an outer member, a tire or tread carried thereby, said outer member being provided with flat sections which are slidably received in the spaces between the pairs of radial arms aforesaid and have openings, members cross-connecting the pairs of radial arms and loosely passing through the openings aforesaid, sliding rods pivoted to the outer member and also pivotally connected to the inner member at the hub thereof, springs encircling said rods and exerting pressure between the inner and outer members, said rods and springs lying in the spaces between consecutive pairs of arms and being adapted to play therein as the inner and outer members move peripherally in relation to each other and adjustable devices on said rods for regulating and maintaining the tension of said springs.

In testimony whereof, I hereunto affix my signature in presence of two witnesses.

GEORGE O. CLARK.

Witnesses:
GEORGE G. McDONALD,
WILSON F. BARTLETT.

Copies of this patent may be obtained for five cents each, by addressing the "Commissioner of Patents, Washington, D. C."